United States Patent Office 2,853,386
Patented Sept. 23, 1958

2,853,386

NOVEL FOOD PRODUCT AND METHOD FOR PRODUCING THE SAME

James E. Hughes, New York, N. Y.

No Drawing. Application September 3, 1957
Serial No. 681,481

18 Claims. (Cl. 99—54)

This invention relates to novel food products and to methods for producing the same and more particularly to products which may be prepared for consumption as particularly palatable and nutritious beverages or, alternatively, in refrigerated form, as desserts. The present application is a continuation-in-part of my copending application Serial No. 632,643, filed January 7, 1957, now abandoned.

The benefits to be derived from the consumption of milk, as a liquid or in other forms or food dishes, are too well known to require discussion. So, too, with fruit juices generally and citrus fruit juices specifically where particularly desirable vitamin constituents are present.

The inherent difficulties present in connection with the combining of milk, which has a tendency to ready curdling, and a fruit juice having a relatively high acid content, without the use of a chemical neutralizer, heretofore have precluded the production of a satisfactory food product of the character with which we are here concerned. There has been much experimentation along such lines over a substantial period of years without success. The products which have been produced under prior art teachings are far from palatable, in many cases have lost essential vitamins during the processes employed, and are sufficiently devoid of "lasting" characteristics so as to deteriorate rapidly, in the absence of consumption substantially immediately following preparation, so as to become valueless with respect to palatability and also nutritional values.

Accordingly, it is a major purpose of the present invention to produce a novel milk and fruit juice beverage without chemical neutralizer which will be highly palatable, have a high protein content, a smooth and creamy consistency, and a relatively long life without deterioration under refrigeration.

It is a further object of the invention to produce a novel combined milk and fruit juice food product which will provide a particularly pleasing and nutritious dessert per se or to which other constituents may be added, such as fruits, or the like, to enhance the character thereof and provide for variety, the product being vastly different as well as readily distinguishable from any other food product presently on the market.

It is a still further object of the present invention to provide a novel milk and fruit juice product which may be prepared in bulk form to provide a base or stock material which is suspectible of ready retention in the frozen state whereby appropriate quantities of the novel beverage of the present invention may be prepared as desired through simple dilution of the base material or concentrate with milk, water or other neutral liquid, and appropriate mixing.

It is a still further object of the present invention to provide a novel milk and fruit juice product which may be packaged, either in glass bottles, paper cartons, etc., and distributed through ordinary channels and with a minimum of refrigeration, the distribution system contemplated being identical to that employed commercially in connection with the distribution and sale of fresh liquid milk.

It will be understood that the term "milk" as used hereafter is intended to encompass the many forms thereof including whole milk, skim milk, dried whole milk, dried skim milk, condensed milk, malted milk, etc.

The consumption of milk in the United States, particular thought being given to the fact that the dairy industry is at all times confronted with large surpluses, is far below a desirable level. Statistics disclose that during peak production periods quantities of dry milk in storage run into the hundred of millions of pounds in excess of that absorbed by the market in this country. Thus, in addition to the costs of transportation and storage, it is necessary to seek foreign markets for such surpluses where the product is disposed of at a figure approximating one-third of actual costs.

The present invention contemplates the provision of a startlingly new product which will utilize milk in any of the forms thereof as: fresh, skim, dry, etc., and through such utilization will provide for wider consumption as well as incalculable assistance to one of the country's basic industries.

Further objects and advantages of the invention will be readily apparent from the following specification wherein certain of the several methods whereby the present invention may be practiced will be set forth.

Applicant has found that milk and fruit juices may be combined in a particularly palatable and high protein beverage or food product which will remain stable without any necessity for employing chemical neutralizers provided that appropriate steps are taken to prevent curdling of the milk constituent. When this is done, as will be taught hereinafter, the fruit juice remains within the product, whether beverage or dessert, as a finely divided and widely dispersed mixture, thus providing for uniformity of flavor without noticeable particles or agglomerations of particles of fruit per se, no matter how minute.

To accomplish this end it has been found essential that a comparatively small quantity of a suitable colloid be added during the mixing operation and that this addition be accomplished in a specific manner. There are several such colloids which are readily available on the open market including gelatin, pectin, gum arabic, gum tragacanth, agar, etc.; gelatin has been found to be particularly satisfactory for present purposes as well as desirably economical.

The process contemplated by the present invention includes as an essential portion thereof a gelling process in which, as is commonly known, temperature is an important factor. First, the solution must be hot enough for proper dissolution of the colloid and other (if any) dry constituents; second, the mixture must be cooled, at which time coating, thickening, and finally solidifying takes place. Further, the solid state may be avoided by reducing the quantity of colloid below that required to produce solidification.

The beverage and the dessert referred to hereabove may be produced in either of two ways, there being comparatively little difference in the preparation of the two products. For purposes of simplicity, consideration first will be given to the preparation of the novel dessert; thereafter, production of the beverage, with or without the inclusion of an additional step, will be discussed.

It should be understood that a gel can be produced consistently, under proper conditions, by mixing 1 part by dry weight of a suitable colloid such as gelatin with 160 parts of the liquified product with which we presently are concerned. Additionally, it has been found in practice that if this ratio is reduced below 1 part of gelatin to 25 parts of liquid, satisfactory results are not obtained, particular reference being had to the novel dessert product under discussion. Further, applicant has found that optimum results for the purposes contemplated are obtained when the ratio employed approximates 1 part by weight of gelatin to 128 parts weight of liquid.

For purposes of illustration, where it is desired to produce 128 ounces of finished product, using gelatin as the colloid, the initial step of the novel process under consideration requires the thorough mixing of 1 ounce of gelatin with 40 ounces of milk. Where dried milk is employed it is desirable that the amount thereof be sufficient so as to bring 40 ounces of water to the nutritional equivalent of 64 ounces of milk. Suitable sweetening or flavoring may be added at this time, if desired, or later.

It should be borne in mind that the mixture must be sufficiently hot to properly dissolve the gelatin, or other colloid employed, it being well known that a temperature on the order of 140° F. is adequate for such purposes where gelatin is the colloid. So, too, where dried milk is employed unless this product is of the instantaneous variety.

After this mixture is dissolved it is allowed to cool to approximately room temperature before the fruit juice or concentrated fruit juice, desirably orange or other citrus fruit juice may be employed, is added. The necessity for such cooling stems from the fact that the protective coating or barrier provided by the colloid must be set up and that vitamin C in the fruit juice is destroyed by heat.

After the cooling step referred to hereabove, the quantity of fruit juice or concentrated fruit juice added is a matter of individual taste. Where a relatively high vitamin C content is desired, 24 ounces of concentrated orange juice may be employed. Now 64 ounces of milk may be added—either whole milk, skim milk, or dried whole or skim milk and water to the equivalent of milk. If desired, water or other suitable neutral fluid may be employed.

The foregoing mixture is placed promptly under refrigeration and permitted to gel. After such gelling has taken place, a particularly palatable and pleasing dessert will have been produced which may be converted into a delightful beverage by simple agitation in a cocktail shaker, or the like, or mixing in a suitable mixer or blender.

If the process described hereabove is followed except that the quantity of colloid or gelatin employed is less than that required to produce a solidified product, the cooling of the mixture will result in coating and slight thickening; however, the end product will remain a liquid which may be marketed in bottles, cartons, or the like, and distributed through ordinary commercial channels under light refrigeration, the distribution system contemplated being identical to that employed commercially in connection with the distribution and sale of fresh liquid milk.

The steps described in detail hereabove originally were followed for the express purpose of avoiding the destruction of the vitamin C content of the fruit juice. This was accomplished, of course, and simultaneously therewith other surprising and unexpected results were obtained: the product remained completely homogeneous; there was no evidence of any watery substance present; the material adhered uniformly to the sides of the container; and, where gelling was accomplished, a hole spooned into the product produced no sweating.

These facts disclosed that for the first time in years of attempts to produce an uncurdled end result in mixing milk and fruit juice, a method had been found which would provide this result without the employment of neutralizing chemicals or recourse to methods which destroy vitamins or otherwise deteriorate the food value of the product. Accordingly, it is clearly indicated that by the foregoing process the gelatin or other colloid employed actually sets up a barrier between the curdling prone milk and the acid fruit juice which becomes effective as the gelling process progresses, well prior to the reaching of the semi-solid or solid state. As with any colloid-containing mixture, the present product should be placed under refrigeration promptly upon completion of the preparation or mixing thereof.

To produce the foregoing product in concentrated form, where subsequent production of the novel beverage is desired, 1 ounce of gelatin or other suitable colloid is mixed (hot) with 40 ounces of milk in whatever form desired. Again, sweetening or flavoring agents may be added at this time, or subsequently, depending upon individual taste. The mixture then is cooled to substantially room temperature and 24 ounces of fruit juice or concentrated fruit juice may be added. This mixture may be placed in suitable containers, which desirably are one-half the size of the quantity of beverage to be produced, and placed promptly in a freezer. With such quick freezing the product will remain stable for an indefinite period of time.

By reason of convenience of storage and because the procedure suggested allows preparation in considerable quantities, this process has been followed generally by applicant. When consumption was desired, a container was removed from the freezer, permitted to stand until partial thawing occurred, and then was blended with an equal quantity of either milk or water and served. The beverage was highly palatable, delightful in taste, and contained all of the vitamins, proteins, and food values contemplated.

It will be understood that where the concentrate is to be prepared commercially, there is not need for the utilizing of a container in excess of the actual size required for the contents thereof. Thus, the concentrate contemplated by the present invention may be produced and marketed in frozen form just as is done under present day commercial practices with other frozen beverage concentrates. Following such procedure, all that would be required for the production of the milk and fruit juice beverage contemplated would be to thaw the frozen product and add thereto a substantially identical quantity of water or milk as might be preferred.

It is pointed out that where a dessert is desired, there is to be no freezing, the mixing being followed by immediate refrigeration only so that prompt gelling will take place. This gelled product may thereafter be agitated to liquid form to produce a beverage or may be consumed as a dessert in gelled form. However, the present concentrate may be frozen readily whereby beverage may be produced subsequently without the necessity for any steps other than thawing and adding an appropriate quantity of suitable liquid.

Satisfactory solid or semi-solid products have been produced using the following proportions, all parts being stated by weight:

|  | Parts |
|---|---|
| Dried milk and water | 130 |
| Gelatin | 1 |
| Fruit juice | 30 |

In the foregoing product the percentage ratio of gelatin to finished food product is .625%.

|  | Parts |
|---|---|
| Dried milk and water | 20.3 |
| Gelatin | 1 |
| Fruit juice | 4.65 |

In this food product the percentage ratio of gelatin to finished item is 4%.

Highly satisfactory liquid products have been produced using the following proportions, all parts being stated by weight:

|  | Parts |
|---|---|
| Dried milk and water | 143 |
| Gelatin | 1 |
| Fruit juice | 38 |

In this liquid product the percentage ratio of gelatin to total beverage is .568%.

| | Parts |
|---|---|
| Dried milk and water | 812.5 |
| Gelatin | 1 |
| Fruit juice | 187.5 |

In the foregoing example the percentage ratio of gelatin to beverage is .1%.

It will be understood that in each of the examples, liquid milk, either in whole or in part, may be substituted for dry milk and water without adverse effect upon the beverage produced.

To produce a beverage of pleasing consistency (reference being had to viscosity) and flavor, with all of the nutritional values of milk and orange juice, the following proportions are recommended:

| | Ounces |
|---|---|
| Dried milk (non instantaneous) | 3 to 3¼ |
| Water | 26 |
| Gelatin | 1/12 |
| Concentrated orange juice | 6 to 8 |
| Dash of salt. | |
| Sweetening to taste. | |

In the foregoing example the percentage ratio of gelatin to beverage is .235%. It is known that the pH of milk averages 6.6; further, the pH of the orange concentrate contemplated average 3.6. The pH of the novel beverages and other food products contemplated herein will approximate 4.0 to 4.5, this being a particularly desirable range.

Where a low calories beverage is desired, liquid skim milk may be substituted for the whole milk contemplated. The flavor and general creaminess of the beverage is not thereby affected; however, it may be necessary to add a small quantity of a suitable sugar substitute, such as sucaryl, to suit the individual palate. Where caloric intake is not a consideration, while milk, with or without sugar in accordance with individual preference, provides a beverage having high food values and containing all of the beneficial characteristics of milk together with the full vitamin content of the fruit juice utilized.

It should be noted that a heated mixture is employed only during the dissolving and blending of the dry milk and gelatin. At all other times the instant process contemplates use of component ingredients at normal or room temperatures whereby there will be no adverse effects as to vitamin C present, volatile flavoring, etc.

Care should be exercised that the blended mixture does not stand at room temperature for any substantial period of time prior to refrigeration whereby separation of the citrus fruit juice component may begin. Where refrigeration is accomplished rapidly, an entirely homogeneous product is obtained which may be left at room temperature thereafter for considerable periods of time, where occasion may require, without unfavorable results. However, since we presently are concerned with what is essentially a milk product, continuous refrigeration until consumption is desirable.

Since there are varying degrees of sweetness in both oranges per se and brands of orange concentrate, sweetening agents may be desired to satisfy individual tastes. Further, other fruit juices such as lemon, lime, etc., may be employed with equal facility dependent only upon the ultimate flavor desired.

Experimentation has disclosed that dissolving the gelatin or other colloid in a solution of dried milk and water results in the creation of an effective barrier. Thereafter, when normally acid fruit juice is added to the solution, curdling cannot occur, if the instant inventive teachings be followed, and the fruit juice, whether in droplets or minute particles, remains in uniform distribution and suspension throughout the mixture.

It also will be understood that while the process for preparing the present food product has been described as including the progressive steps of (a) introducing the colloid into the hot mixture, (b) cooling the solution, (c) adding the fruit or other juice, (d) refrigerating the mixture, and (e) adding milk or other neutral liquid to provide the finished product, these steps may be varied in several ways. For example, it may be found desirable to add refrigerated milk or other neutral liquid to the cooled colloid solution, following steps (a) and (b) and then mix in the fruit juice and place the product under refrigeration. Thereafter, removal from the refrigerator and simple agitation, with or without the addition of neutral liquid to govern viscosity, are all that is required to restore the solidified preparation to suitable beverage consistency. Where the quantity of colloid is sufficiently small that no gelling occurs, the beverage may be prepared to be ready for consumption at all times.

It will be understood that where the term "room temperature" has been employed hereabove, reference being had to the cooling step required following the dissolving of the gelatin, a temperature on the order of 70° F. or less in contemplated.

While but one form of the invention has been described as to both beverage and dessert it will be obvious to those skilled in this art that various changes may be made therein without departing from the spirit and scope hereof and therefore the invention is not considered limited to that which is described in the specification but only as indicated in the accompanying claims.

What is claimed is:

1. A method of combining milk with an acid fruit juice forming a stable milk-citrus fruit juice product of smooth consistency and long life under refrigeration which includes the steps of dissolving a colloid in hot milk, cooling the resultant solution to a temperature on the order of 70° F. and below, and adding citrus fruit juice, the cooling of the milk-colloid solution having the effect of setting up a barrier between the milk and acid fruit juice whereby fruit juice particles and casein particles remain in dispersed suspension and at the same time destruction of the vitamin C in the fruit juice is avoided.

2. The method of producing a food product containing milk and fruit juice forming a stable milk-citrus fruit juice product of smooth consistency and long life under refrigeration which includes the steps of dissolving a colloid in hot milk, cooling the mixture to a temperature on the order of 70° F. and below, mixing citrus fruit juice into the cooled mixture, and gelling the resulting product under refrigeration.

3. The method of producing a beverage containing milk and fruit juice forming a stable milk-citrus fruit juice product of smooth consistency and long life under refrigeration which includes the steps of dissolving a colloid in hot milk, cooling the mixture to a temperature on the order of 70° F. and below, mixing acid citrus fruit juice into the cooled mixture, gelling the resulting product under refrigeration, and mixing liquid milk into the gelled product to provide a beverage of desired consistency.

4. The method of producing a beverage containing milk and fruit juice forming a stable milk-citrus fruit juice product of smooth consistency and long life under refrigeration which includes the steps of dissolving a colloid in hot milk, cooling the mixture to room temperature, and mixing concentrated citrus fruit juice into the cooled mixture.

5. The method of claim 2 which includes the step of gelling the finished product under refrigeration.

6. The method of claim 3 which includes the step of mixing the gelled product to restore it to beverage form.

7. The method of producing a food product containing milk and fruit juice forming a stable milk-citrus fruit juice product of smooth consistency and long life under refrigeration which includes the steps of dissolving a colloid in hot milk and thoroughly mixing the solution, cooling the mixture to room temperature, mixing into the cooled mixture acid citrus fruit juice, and gelling the resulting product under refrigeration.

8. A stable milk-citrus fruit juice product of smooth consistency and long life under refrigeration containing as the essential ingredients thereof a colloid solution in milk, the solution carrying a citrus fruit juice suspended therein, the colloid serving to form a barrier whereby the fruit juice particles and casein particles remain in dispersed suspension, thereby avoiding curdling.

9. A stable milk-citrus fruit juice beverage of smooth consistency and long life under refrigeration containing as the essential ingredients thereof a colloid solution in milk, the solution carrying a citrus fruit juice suspended therein, the colloid serving to form a barrier between the milk and fruit juice whereby fruit juice particles and casein particles remain in dispersed suspension.

10. A food product as set forth in claim 8 where the colloid is gelatin.

11. A food product as set forth in claim 8 where the ingredients are compounded in the following proportions, all parts being stated by weight:

| | Parts |
|---|---|
| Milk | 104 |
| Fruit juice | 24 |
| Gelatin | 1 |

12. A food product as set forth in claim 8 where the ingredients are compounded in the following proportions, all parts being stated by weight:

| | Parts |
|---|---|
| Milk | 20.35 to 130 |
| Gelatin | 1 |
| Concentrated fruit juice | 4.65 to 24 |

13. A stable milk-citrus fruit juice gelled dessert as set forth in claim 8 of smooth consistency and long life under refrigeration, containing as essential ingredients:

| | Parts |
|---|---|
| Milk | 104 |
| Concentrated fruit juice | 24 |
| Gelatin | 1 |

14. A stable milk-citrus fruit juice concentrate as set forth in claim 8 of smooth consistency and long life under refrigeration, for producing a beverage containing as essential ingredients, all parts being stated by weight:

| | Parts |
|---|---|
| Milk | 7.85 to 50 |
| Gelatin | 1 |
| Concentrated citrus fruit juice | 4.65 to 24 |

15. A beverage as set forth in claim 8 where the ingredients are compounded in the following proportions, all parts being stated by weight:

| | Parts |
|---|---|
| Milk | 143 |
| Gelatin | 1 |
| Fruit juice | 38 |

16. A beverage as set forth in claim 8 where the ingredients are compounded in the following proportions, all parts being stated by weight:

| | Parts |
|---|---|
| Milk | 812.5 |
| Gelatin | 1 |
| Fruit juice | 187.5 |

17. A beverage as set forth in claim 8 where the ingredients are compounded in the following proportions, all parts being stated by weight:

| | Parts |
|---|---|
| Milk | 143 to 812.5 |
| Gelatin | 1 |
| Fruit juice | 38 to 187.5 |

18. A beverage as set forth in claim 8 where the ingredients are compounded in the following proportions, all parts being stated by weight:

| | Ounces |
|---|---|
| Dried milk | 3 to 3¼ |
| Water | 26 |
| Gelatin | 1/12 |
| Concentrated orange juice | 6 to 8 |
| Dash of salt. | |
| Sweetening to taste. | |

References Cited in the file of this patent

UNITED STATES PATENTS

| 1,815,727 | Reynolds et al. | July 21, 1931 |
| 1,925,441 | Finley et al. | Sept. 5, 1933 |
| 2,199,522 | Jones | May 7, 1940 |
| 2,253,614 | Epstein | Aug. 26, 1941 |
| 2,818,342 | Ransom | Dec. 31, 1957 |